United States Patent
Kupratis et al.

(10) Patent No.: US 9,222,409 B2
(45) Date of Patent: Dec. 29, 2015

(54) AEROSPACE ENGINE WITH AUGMENTING TURBOJET

(75) Inventors: Daniel Bernard Kupratis, Wallingford, CT (US); Joseph B. Staubach, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 943 days.

(21) Appl. No.: 13/421,241

(22) Filed: Mar. 15, 2012

(65) Prior Publication Data

US 2013/0239576 A1  Sep. 19, 2013

(51) Int. Cl.
| | |
|---|---|
| *F02C 6/02* | (2006.01) |
| *F02K 3/12* | (2006.01) |
| *F02C 6/00* | (2006.01) |
| *F02C 3/04* | (2006.01) |
| *F02C 3/13* | (2006.01) |
| *F02C 9/18* | (2006.01) |

(52) U.S. Cl.
CPC ... *F02C 3/04* (2013.01); *F02C 3/13* (2013.01); *F02C 6/02* (2013.01); *F02C 9/18* (2013.01); *F02K 3/12* (2013.01); *F02C 6/00* (2013.01); *F05D 2250/30* (2013.01); *F05D 2250/311* (2013.01); *F05D 2270/07* (2013.01)

(58) Field of Classification Search
CPC ............... F02C 6/00; F02C 6/02; F02K 3/12
USPC .................................................. 60/39.15, 791
See application file for complete search history.

(56) References Cited

U.S. PATENT DOCUMENTS

| | | | | | |
|---|---|---|---|---|---|
| 2,454,738 | A | * | 11/1948 | Hawthorne | F02C 3/073 60/268 |
| 2,601,194 | A | * | 6/1952 | Whittle | F02K 3/12 60/226.1 |
| 2,704,434 | A | * | 3/1955 | Schmitt | F02K 3/12 60/263 |
| 2,810,258 | A | * | 10/1957 | Cook | F02K 3/02 60/243 |

(Continued)

FOREIGN PATENT DOCUMENTS

| | | |
|---|---|---|
| EP | 2518293 A2 | 10/2012 |
| GB | 1020145 | 2/1966 |

OTHER PUBLICATIONS

"Garrett ATF3" Wikipedia, at http://en.wikipedia.org/wiki/Garrett_ATF3, visited on Mar. 29, 2011, 3 pages.

(Continued)

*Primary Examiner* — William H Rodriguez
*Assistant Examiner* — Rene Ford
(74) *Attorney, Agent, or Firm* — Kinney & Lange, P.A.

(57) ABSTRACT

A gas turbine engine system includes a fan section, a low pressure compressor section downstream of the fan section, a first engine core downstream from the low pressure compressor section, a second engine core downstream from the low pressure compressor section, and a flowpath control mechanism configured to selectively restrict fluid flow through the second engine core. The first engine core includes a first engine core compressor section, a first engine core combustor downstream of the first engine core compressor section, and a first engine core turbine section downstream of the first engine core combustor. The second engine core includes a second engine core compressor section, a second engine core combustor downstream of the second engine core compressor section, and a second engine core turbine section downstream of the second engine core combustor.

19 Claims, 2 Drawing Sheets

(56) References Cited

U.S. PATENT DOCUMENTS

| | | | | |
|---|---|---|---|---|
| 2,929,207 | A * | 3/1960 | Peterson | F02C 6/02 60/224 |
| 3,154,915 | A * | 11/1964 | Eichholtz | F02C 6/003 60/244 |
| 3,368,352 | A * | 2/1968 | Hewson | F02K 3/025 60/224 |
| 3,589,132 | A | 6/1971 | DuPont | |
| 3,659,422 | A * | 5/1972 | Hope | F02K 1/08 60/224 |
| 3,677,012 | A * | 7/1972 | Batscha | F02K 3/065 60/262 |
| 3,841,091 | A | 10/1974 | Sargisson et al. | |
| 4,044,971 | A | 8/1977 | Pharris | |
| 4,064,692 | A | 12/1977 | Johnson et al. | |
| 4,141,212 | A | 2/1979 | Koschier | |
| 4,147,024 | A * | 4/1979 | Moellmann | F02C 6/02 60/39.15 |
| 4,149,374 | A * | 4/1979 | Barchenko | F02C 7/36 60/225 |
| 4,183,211 | A * | 1/1980 | Menioux | F02C 6/00 60/224 |
| 4,448,019 | A | 5/1984 | Klees | |
| 4,497,171 | A | 2/1985 | Corrigan et al. | |
| 4,519,208 | A * | 5/1985 | Loisy | F02K 3/075 60/262 |
| 4,567,724 | A | 2/1986 | Mongia et al. | |
| 4,640,091 | A | 2/1987 | Blizzard | |
| 4,687,412 | A | 8/1987 | Chamberlain | |
| 5,485,717 | A | 1/1996 | Williams | |
| 5,485,719 | A | 1/1996 | Wulf | |
| 5,937,633 | A | 8/1999 | Wang | |
| 6,092,361 | A | 7/2000 | Romani | |
| 6,385,959 | B1 * | 5/2002 | Montoya | F02C 3/13 60/39.15 |
| 6,415,597 | B1 | 7/2002 | Futamura et al. | |
| 6,868,664 | B2 | 3/2005 | Alberto et al. | |
| 7,062,900 | B1 | 6/2006 | Brun | |
| 7,134,269 | B2 | 11/2006 | Walsh et al. | |
| 7,383,684 | B2 | 6/2008 | Vuk | |
| 7,424,805 | B2 | 9/2008 | Johnson | |
| 7,464,533 | B2 | 12/2008 | Wollenweber | |
| 7,555,891 | B2 | 7/2009 | Muller et al. | |
| 7,721,524 | B2 | 5/2010 | Jahnsen | |
| 7,752,835 | B2 | 7/2010 | Jones et al. | |
| 7,770,377 | B2 | 8/2010 | Rolt | |
| 7,841,182 | B2 | 11/2010 | Martin | |
| 7,877,980 | B2 | 2/2011 | Johnson | |
| 7,908,072 | B2 | 3/2011 | Tonno et al. | |
| 2005/0060983 | A1 | 3/2005 | Lardellier | |
| 2005/0210863 | A1 | 9/2005 | Wollenweber et al. | |
| 2007/0126292 | A1 | 6/2007 | Lugg | |
| 2007/0245710 | A1 | 10/2007 | Schumacher et al. | |
| 2007/0277500 | A1 | 12/2007 | Jones et al. | |
| 2008/0155961 | A1 | 7/2008 | Johnson | |
| 2009/0056309 | A1 | 3/2009 | Roberge | |
| 2009/0314003 | A1 | 12/2009 | Talan | |
| 2011/0056208 | A1 | 3/2011 | Norris et al. | |
| 2012/0272656 | A1 | 11/2012 | Norris | |
| 2012/0304660 | A1 * | 12/2012 | Kupratis | F02C 3/145 60/772 |
| 2013/0000323 | A1 * | 1/2013 | Kupratis | F02C 7/36 60/801 |
| 2013/0145769 | A1 * | 6/2013 | Norris | F02K 3/105 60/772 |
| 2013/0255224 | A1 * | 10/2013 | Kupratis | F02C 6/02 60/226.1 |
| 2015/0247456 | A1 * | 9/2015 | Suciu | F02C 3/14 60/791 |

OTHER PUBLICATIONS

"Ryan Compass Cope Engine" The Garrett AiResearch ATF3 Online Museum, at http://web.me.com/jcefamily/ATF3/Ryan_Compass_Cope_Engine.html, visited Mar. 29, 2011, 1 page.

"ATF3 Turbofan Engine Photo's & Graphics" The Garrett AiResearch ATF3 Online Museum, at http://web.me.com/jcefamily/ATF3/Photos.html, visited Mar. 29, 2011, 1 page.

"Frist Article from Aviation Week" The Garrett AiResearch ATF3 Online Museum, at http://web.me.com/jcefamily/ATF3/Av_Wk_Article.html, visited Mar. 29, 2011, 1 page.

"AFT3 X-Section", The Garrett AiResearch ATF3 Online Museum, at http://web.me.com/jcefamily/ATF3/ATF3_X-Section.html, visited Mar. 29, 2011, 1 page.

J. Evans, "Chronology of the ATF3", The Garrett AiResearch ATF3 Online Museum, at http://web.me.com/jcefamily/ATF3/ATF3_Chronology.html, Dec. 2, 2009, 1 page.

International Search Report and Written Opinion from PCT Application Serial No. PCT/US2013/022961, dated Mar. 29, 2013, 12 pages.

Extended European Search Report for EP Application No. 13760947.5, dated Sep. 18, 2015, 7 pages.

\* cited by examiner

FIG. 1

FIG. 2

AEROSPACE ENGINE WITH AUGMENTING TURBOJET

BACKGROUND

The present invention relates generally to a gas turbine engine system and a method of operating the same.

A typical gas turbine engine provides a generally axial flow of fluids through the engine, with those fluids entering a forward inlet of the engine and exiting an aft exhaust outlet while following a path that always extends generally rearward. Radial flow engines, for example where air is diverted in a direction perpendicular to an engine centerline, are also known. However, reverse-flow gas turbine engines are also known where a primary flowpath of the engine "reverses" whereby a portion of that flowpath is turned so as to travel forward through the engine before being turned again to exit a generally aft portion of the engine.

Gas turbine engines, whether of the axial flow, radial flow, or reverse flow variety, generally use shafts to rotationally link different sections of the engine (e.g., a low pressure compressor section and a low pressure turbine section). Rotationally linked sections are commonly referred to in the art as "spools".

Different engine sections have different operational efficiencies. Engine core efficiency increases with temperature and pressure. Engine propulsors (fans) become more efficient at lower pressure ratios and become more efficient at relatively low power levels (i.e., relatively low throttle levels), while engine cores (e.g., a higher pressure section of the engine including a compressor section, combustor, and turbine section) typically operate at relatively high efficiency at relatively high power levels with high temperatures and pressures (i.e., relatively high throttle levels). Because different sections of prior art gas turbine engines are bound to some fixed rotational relationship (e.g., a given throttle setting produces a given operational power level from both the fan section and the core), different engine sections have countervailing operational minimums. This results in a tradeoff. In the aerospace context, an aircraft's gas turbine engine(s) will generally have relatively low fan efficiency and relatively high core efficiency during takeoff (or other relatively high throttle conditions), and have relatively high fan efficiency and relatively low core efficiency for cruise (or loiter) conditions (or other relatively low throttle conditions).

In some applications, thrust augmenters (e.g., afterburners) are provided to allow for additional thrust at selected times in a flight envelope. Thrust augmenters are used, for example, to assist with supersonic flight and for maneuverability. However, known thrust augmenters like afterburners are relatively fuel inefficient. Inefficiencies for thrust augmenters also arise from the need to adjust pressure ratios of other sections of an engine to less than optimal levels (for those sections in isolation) in order to permit proper functioning of the thrust augmenter (e.g., afterburner).

SUMMARY

A gas turbine engine system according to the present invention includes a fan section, a low pressure compressor section downstream of the fan section, a first engine core downstream from the low pressure compressor section, a second engine core downstream from the low pressure compressor section, and a flowpath control mechanism configured to selectively restrict fluid flow through the second engine core. The first engine core includes a first engine core compressor section, a first engine core combustor downstream of the first engine core compressor section, and a first engine core turbine section downstream of the first engine core combustor. The second engine core includes a second engine core compressor section, a second engine core combustor downstream of the second engine core compressor section, and a second engine core turbine section downstream of the second engine core combustor.

While the above-identified drawing figures set forth embodiments of the invention, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

A gas turbine engine system according to the present invention allows effective engine core size to be selectably controlled during operation (e.g., in-flight) to help dynamically match effective core size to operational (e.g., flight envelope) conditions over time. Different engine cores can be utilized at different times during operation. When an engine core is not in use, a flow control mechanism can restrict fluid flow through that engine core and the unused engine core can turn its combustor off. In one embodiment, two coaxially arranged engine cores are provided. In such an embodiment, a primary engine core can have a reverse-flow configuration, and a secondary or augmenting engine core can have either an axial, reverse-flow or other suitable configuration. Common fan, compressor and turbine sections can be shared by all cores. A clutch can optionally provide a selective torque coupling between the primary and secondary/augmenting engine cores. Flow mixing can be provided to help reduce exhaust signature of the engine system. Numerous other features and benefits of the present invention will be appreciated in view of the description that follows and the accompanying figures.

Figure 1:
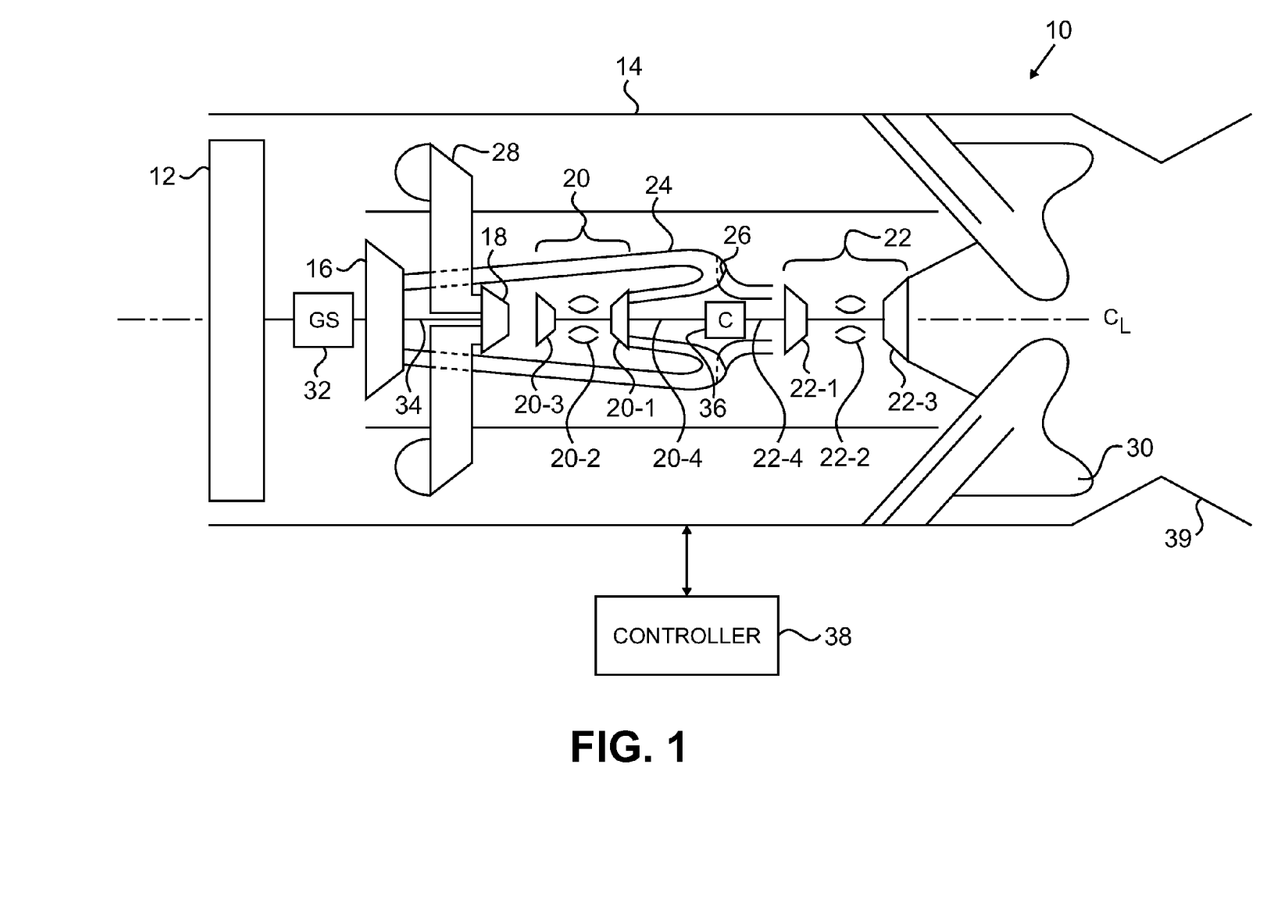
FIG. 1 is a schematic illustration of one embodiment of an engine system according to the present invention.

FIG. 1 is a schematic illustration of one embodiment of a gas turbine engine system 10 that includes a fan section 12, a bypass duct 14, a low pressure compressor (LPC) section 16, a low pressure turbine (LPT) section 18, a first engine core 20, a second engine core 22, a flow duct 24, a flowpath control mechanism 26, exhaust pipes 28, and a flow mixer 30. The engine system 10 defines an engine centerline axis $C_L$. It should be noted that the representation of engine system 10 in FIG. 1 is provided by way of example and not limitation. FIG. 1 is highly schematic. Those of ordinary skill in the art will appreciate that various other components and sections not specifically shown in FIG. 1 can be included in the engine system 10, and that the specific layout of the engine system 10 can vary as desired for particular applications.

The fan section 12 can move fluid (e.g., air) into the bypass duct 14 and a primary flowpath that passes through the LPC section 16, with a ratio of fluid flow divided between those bypass and primary flowpaths selected as desired for particular applications. The bypass duct 14 and the LPC section 16 are both arranged downstream of the fan section 12, and are operationally arranged in parallel with each other. A bypass fluid flow that passes from the fan section 12 through the bypass duct 14 can bypass the first and second engine cores 20 and 22. The fan section 12 and the LPC section 16 can be rotationally linked. For example, a gear system 32 can optionally be provided to allow torque transmission in between the fan section 12 and the LPC section 16 at different rotational speeds. The gear system 32 can have any desired configuration, such as a known fan drive gear system. In further embodiments, the gear system 32 can be omitted and a direct 1:1 mechanical shaft coupling provided instead, for example. In the illustrated embodiment, the fan section 12, the bypass duct 14 and the LPC section 16 each provide for generally axial, forward-aft fluid flow relative to the centerline axis $C_L$.

The LPC section 16 can compress fluid (e.g., air). The LPC section 16 can be rotationally coupled to the LPT section 18 by a shaft 34 to define a spool. Rotational energy can be extracted from the fluid flow by the LPT section 18. As shown in FIG. 1, the LPC section 16 and the LPT section 18 have reverse-flow orientations relative to each other. In other words, fluid flows through the LPT section 18 in generally an opposite direction from fluid flow through the LPC section 16, as will be explained further below.

The flow duct 24 directs fluid flow from the LPC section 16 to the first engine core 20 and the second engine core 22. In the illustrated embodiment, the flow duct 24 is configured to help redirect fluid flow to achieve a change in flow direction, such as a flow reversal from forward-aft to aft-forward, before reaching the first engine core 20.

The first engine core 20 is located downstream of the LPC section 16 and the flow duct 24, and includes a compressor section 20-1 (e.g., high pressure compressor), a combustor 20-2, and a turbine section 20-3 (e.g., high pressure turbine). The combustor 20-2 is generally downstream of the compressor section 20-1 and the turbine section 20-3 is generally downstream of the combustor 20-2. The first engine core 20 can further include a shaft 20-4 that can rotationally couple the compressor section 20-1 and the turbine section 20-3. The first engine core 20 can have a reverse-flow configuration, such that fluid flow through the combustor 20-2 and/or other sections can be in a direction generally opposite to that through the fan section 12 and the bypass duct 14, that is, in an aft-forward direction relative to the centerline axis $C_L$.

The LPT section 18 is located downstream of the first engine core 20. Exhaust from the first engine core 20 passes through the LPT section 18, and then exhaust fluid from the LPT section 18 can be passed through one or more exhaust pipes 28 to the bypass duct 14. The exhaust pipes 28 can be circumferentially spaced from each other, and can help achieve a flow reversal such that fluid passing through the exhaust pipes 28 is turned from an aft-forward direction to a forward-aft direction as that fluid enters the bypass duct 14. For convenience, the fan section 12, LPC 16, LPT 18 and first engine core 20, collectively, can be referred to as a turbofan engine of the engine system 10.

The second engine core 22 (also referred to as an aft turbojet or augmenting turbojet) is located downstream of the LPC section 16 and the flow duct 24, and includes a compressor section 22-1 (e.g., high pressure compressor), a combustor 22-2, and a turbine section 22-3 (e.g., high pressure turbine). The combustor 22-2 is generally downstream of the compressor section 22-1 and the turbine section 22-3 is generally downstream of the combustor 22-2. The second engine core 22 can further include a shaft 22-4 that can rotationally couple the compressor section 22-1 and the turbine section 22-3. The second engine core 22 can have a generally axial-flow configuration (or alternatively an at least partially radial flow configuration, etc.), such that fluid flow through the combustor 22-2 and/or other sections can be in generally the same direction as that through the fan section 12 and the bypass duct 14, that is, in an forward-aft direction relative to the centerline axis $C_L$. Exhaust fluid from the second engine core 22 can be passed to the mixing chute 30. In the illustrated embodiment, the second engine core 22 is positioned coaxially with respect to the first engine core 20 relative to the centerline axis $C_L$. Furthermore, the second engine core 22 is positioned axially aft of the first engine core 20 in the illustrated embodiment. Exhaust fluid from the second engine core 22 does not flow through the LPT section 18 in the illustrated embodiment.

A clutch 36 can be optionally provided. The clutch 36 can provide coupling for torque transmission between the shaft 20-4 of the first engine core 20 and the shaft 22-4 of the second engine core 22 by selectively mechanically coupling or decoupling the shafts 20-4 and 22-4. Any suitable clutching mechanism can be used for the clutch 36, such as a friction clutch, and/or a Sprague clutch, etc. In the illustrated embodiment, the clutch 36 is positioned axially between the first and second engine cores 20 and 22, along the centerline axis $C_L$. In embodiments that include the clutch 36, the shafts 20-4 and 22-4 of the first and second engine cores 20 and 22 typically will rotate in the same direction. In embodiments in which the clutch 36 is omitted, the shafts 20-4 and 22-4 of the first and second engine cores 20 and 22 could rotate in the same direction or in opposite directions.

The flowpath control mechanism 26 can extend into the flow duct 24 and can be positioned axially aft of the first engine core 20. In further embodiments, the flowpath control mechanism 26 can have other configurations or positioning. The flowpath control mechanism 26 can be a fluid valve or valves with a movable or adjustable valve element (e.g., flapper or other suitable valve or valves), a duct switching mechanism, or another suitable mechanism that allows for fluid flow to the second engine core 22 to be selectively controlled. Fluid flow through the second engine core 22 can be restricted or entirely blocked by appropriate control of the flowpath control mechanism 26. In one embodiment, the flowpath control mechanism 26 includes at least settings that (a) allow flow through the first engine core 20 but block fluid flow through the second engine core 22 or (b) allow flow through the first engine core 20 and allow fluid flow through the second engine core 22. In scenario (b), a first portion of the primary flowpath fluid flow passes through the first engine core 20 in which at least some of the first portion of the flow is used to generate combustion products, and a second portion of the primary flowpath fluid flow passes through the second engine core 22 in which at least some of the second portion of the flow is used to generate combustion products.

Control of the flowpath control mechanism 26 and/or the clutch 36 can be provided with commands from a controller 38. In one embodiment, the controller 38 can be integrated with a full authority digital engine controller (FADEC) for the entire engine system 10, or, in alternative embodiments, can be a stand-alone, dedicated controller. The controller 38 can further govern operation of the engine cores 20 and 22. For instance, the controller 38 can shut down (or slow down fuel supply to) the combustor 22-2 of the second engine core 22 when the flowpath control mechanism 26 restricts fluid flow through the second engine core 22 and activate (or increase a rate of fuel supply to) the combustor 22-2 when the flowpath control mechanism 26 allows fluid flow through the second engine core 22.

The flow mixer 30 can be positioned at or near an aft, downstream end of the bypass duct and an aft, downstream end of the second engine core 22. In one embodiment, the mixer 30 can be a mixing chute assembly of a conventional configuration, such as with a known lobed configuration. During engine operation, the flow mixer 30 can mix exhaust fluids produced by the first and second engine cores 20 and 22, as well as at least a portion of the fan bypass air from the bypass duct 14, and can help reduce an exhaust signature, reduce noise, etc. A nozzle system 39 can also be included at an aft portion of the engine system 10. It should be understood that various fixed, variable, convergent/divergent, two-dimensional and three-dimensional systems can be utilized for the nozzle system 39, as desired for particular applications. The controller 38 can further govern operation of the nozzle system 39. For instance, the controller 38 can open (i.e., enlarge) a nozzle throat area of the nozzle system 39 based on an increase in rate of fuel supply to the combustor 20-2 and/or combustor 22-2.

Figure 2:
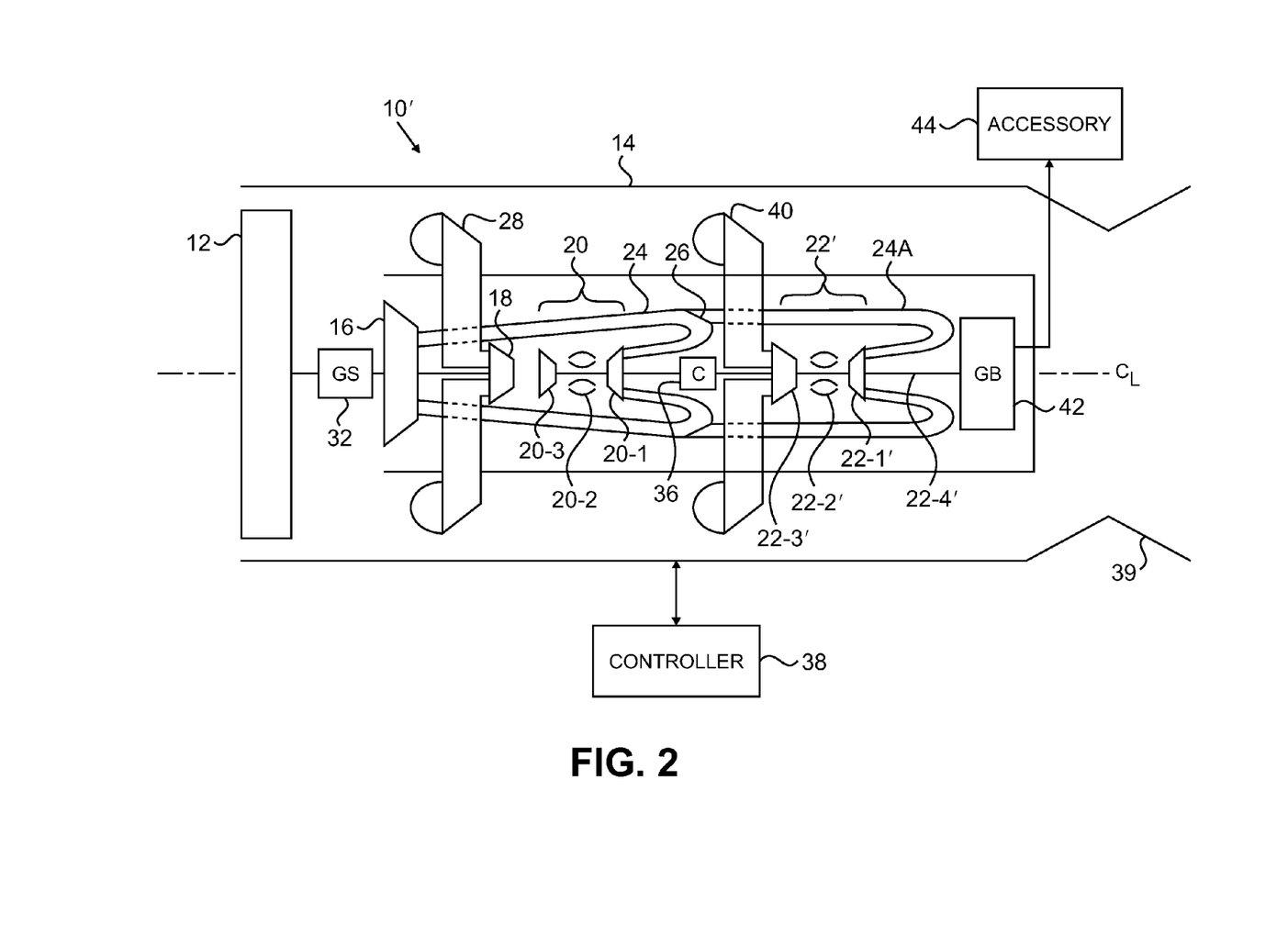
FIG. 2 is a schematic illustration of another embodiment of an engine system according to the present invention.

FIG. 2 is a schematic illustration of another embodiment of a gas turbine engine system 10'. The engine system 10' is generally similar to engine system 10 described above, but with a second engine core 22' having a reverse-flow configuration rather than an axial-flow configuration like the second engine core 22.

As shown in FIG. 2, a flow duct 24A extends from the flow duct 24 to the second engine core 22'. The second engine core 22' (also referred to as an aft turbojet or augmenting turbojet) is located downstream of the LPC section 16 and the flow duct 24, and includes a compressor section 22-1' (e.g., high pressure compressor), a combustor 22-2', and a turbine section 22-3' (e.g., high pressure turbine). The combustor 22-2' is generally downstream of the compressor section 22-1' and the turbine section 22-3' is generally downstream of the combustor 22-2'. The second engine core 22' can further include a shaft 22-4' that can rotationally couple the compressor section 22-1' and the turbine section 22-3'. The second engine core 22' can have a reverse-flow configuration, such that fluid flow through the combustor 22-2' and/or other sections can be in a direction generally opposite to that through the fan section 12 and the bypass duct 14, that is, in an aft-forward direction relative to the centerline axis $C_L$. Exhaust fluid from the second engine core 22' can be passed through one or more exhaust pipes 40 to the bypass duct 14. The exhaust pipes 40 can be positioned downstream of the exhaust pipes 28, and flow mixing of the different exhaust flows can occur within the bypass duct 14. Such mixing within the bypass duct 14 can help reduce an exhaust signature, reduce noise, etc. In the illustrated embodiment, the second engine core 22' is positioned coaxially with respect to the first engine core 20 relative to the centerline axis $C_L$. Furthermore, the second engine core 22' is positioned axially aft of the first engine core 20 in the illustrated embodiment.

The engine system 10' can further include a gearbox 42, which can be mechanically coupled to the shaft 22-4' of the second engine core 22'. The gearbox 42 can act as an accessory gearbox for providing torque to nearly any number of desired accessories, of any desired type. For example, the gearbox 42 can provide a generator that supplies electrical power to an accessory 44, such as an aircraft flight system, a directed energy weapon, etc. In this way, the second engine core 22' can be used whenever high power or energy requirements are demanded, potentially independent of thrust requirements for aircraft flight. Alternatively or in addition, the gearbox can provide a hydraulic pump that supplies hydraulic power to the accessory 44. The gearbox 42 can be located at or near an aft end of the engine system 10', which allows that gearbox 42 to be configured as a line replaceable unit and facilitates easy access for maintenance, etc. However, the particular components and configuration of the gearbox 42 and the accessory 44 can vary as desired for particular applications. A nozzle system 39 can also be included at an aft portion of the engine system 10'. It should be understood that various fixed, variable, convergent/divergent, two-dimensional and three-dimensional systems can be utilized for the nozzle systems 39. The controller 38 can further govern operation of the nozzle system 39. For instance, the controller 38 can open (i.e., enlarge) a nozzle throat area of the nozzle system 39 based on an increase in rate of fuel supply to the combustor 20-2 and/or combustor 22-2'.

TABLE 1

| Aircraft | Turbofan (Fan, LPC, LPT & 1st Engine Core) | | | | | | | Aft Turbojet (2nd Engine Core) | | | | Net: Aft Turbojet + Turbofan | |
|---|---|---|---|---|---|---|---|---|---|---|---|---|---|
| Operation | | | | | | | LPT | | | | | Mixed | Total |
| Flight Regime | Ram PR | BPR | Fuel Flow | FPR | OPR | T3 | Exit Pressure | Fuel Flow | FPR | OPR | T3 | Nozzle PR | Fuel Flow |
| Subsonic | Low | Med. | High | Med. | High | High | Med. | Low | Low | Low | High | Low | Med. |
| Supersonic or Large Accessory Power Supply | High | Med. | Low | Low | Med. | High | Low | High | High | Med. | High | High | Med. |

TABLE 2

| Aircraft Operation | Prior Art Engine With Conventional Afterburner Augmentor | | | | | | | | Net | |
|---|---|---|---|---|---|---|---|---|---|---|
| Flight Regime | Ram PR | BPR | Fuel Flow | Augmentor Fuel Flow | FPR | OPR | T3 | LPT Exit Pressure | Mixed Nozzle PR | Total Fuel Flow |
| Subsonic | Low | Low | Med. | Zero | Med. | Med. | Med. | Med. | Med. | Med. |
| Supersonic | High | Low | Med. | High | High | Low | High | High | High | High |

Tables 1 and 2 provide information on different operating modes of the engine system 10 or 10' of the present invention (Table 1) compared to a prior art engine with a conventional afterburner (Table 2). Table 2 demonstrates, for instance, how afterburners place design constraints on engine pressure ratios and how net or total fuel consumption is relatively high in a supersonic operation mode. In contrast, Table 1 demonstrates, for instance, how in a supersonic mode or when delivering large amounts of power to an accessory, the net or total fuel consumption by the engine system 10 or 10' can be lower than a prior art engine with an afterburner. As used in Tables 1 and 2, Ram PR refers to a pressure ratio at an inlet to a fan section, BPR refers to bypass ratio, FPR refers to a fan pressure ratio, OPR refers to overall pressure ratio, T3 refers to a temperature at a combustor inlet, and other terms have their ordinary meanings in the art.

Those of ordinary skill in the art will recognize many advantages and benefits of the present invention. For example, an engine system according to the present invention can provide relatively high specific thrust with lower thrust-specific fuel consumption at supersonic speeds and other high-power operating modes.

Any relative terms or terms of degree used herein, such as "substantially", "approximately", "essentially", "generally" and the like, should be interpreted in accordance with and subject to any applicable definitions or limits expressly stated herein. In all instances, any relative terms or terms of degree used herein should be interpreted to broadly encompass any relevant disclosed embodiments as well as such ranges or variations as would be understood by a person of ordinary skill in the art in view of the entirety of the present disclosure, such as to encompass ordinary manufacturing tolerance variations, incidental alignment variations, and the like.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims. For example, although the present invention has been described primarily with respect to aerospace applications, it should be understood that it could also be applied to power generation, marine, automotive and other applications.

Discussion of Possible Embodiments

The following are non-exclusive descriptions of possible embodiments of the present invention.

A gas turbine engine system can include a fan section; a low pressure compressor section downstream of the fan section; a first engine core downstream from the low pressure compressor section, the first engine core including a first engine core compressor section; a first engine core combustor downstream of the first engine core compressor section; and a first engine core turbine section downstream of the first engine core combustor; a second engine core downstream from the low pressure compressor section, the second engine core including a second engine core compressor section; a second engine core combustor downstream of the second engine core compressor section; and a second engine core turbine section downstream of the second engine core combustor; a flowpath control mechanism configured to selectively restrict fluid flow through the second engine core.

The system of the preceding paragraph can optionally include, additionally and/or alternatively any, one or more of the following features, configurations and/or additional components:

a bypass duct downstream of the fan section, wherein the bypass duct is operatively connected downstream of the fan section in parallel with the low pressure compressor;

the first engine core can have a reverse flow configuration such that combustion products from the first engine core combustor flow through the first engine core combustor in a direction generally opposite to fluid flow through the fan section, with the first engine core further including an exhaust pipe configured to direct fluid flow from the first engine core turbine section to the bypass duct;

the second engine core can have an axial flow configuration such that combustion products from the second engine core combustor flow through the second engine core combustor in a direction generally the same as fluid flow through the fan section;

a flow mixer configured to mix fluid flows exhausted from both the first and second engine cores;

a bypass fluid flow from the fan section that bypasses the first and second engine cores, wherein the flow mixer is further configured to mix the bypass fluid flow with the fluid flows exhausted from both the first and second engine cores;

the second engine core can have a reverse flow configuration such that combustion products from the second engine core combustor flow in a direction generally opposite to fluid flow through the fan section, the second engine core further including an exhaust pipe configured to direct fluid flow from the second engine core turbine section to the bypass duct;

the first and second engine cores can each have a reverse flow configuration such that combustion products from the first and second engine core combustors flow through the respective first and second engine core combustors in a direction generally opposite to fluid flow through the fan section, the system further including a first exhaust pipe configured to direct fluid flow from the first engine core turbine section to the bypass duct; and a second exhaust pipe configured to direct fluid flow from the second engine core turbine section to the bypass duct;

a low pressure turbine section located downstream of the first engine core, wherein only exhaust fluid from the first engine core passes through the low pressure turbine section;

the flowpath control mechanism can comprise a valve.

a first engine core shaft operably connected between the first engine core compressor section and the first engine core turbine section; a second engine core shaft operably connected between the second engine core compressor section and the second engine core turbine section; and a clutch operably connected between first and second engine core shafts for selectively transmitting torque therebetween;

the flowpath control mechanism can be positioned axially aft of the first engine core.

the flowpath control mechanism can extend into a flow directing duct downstream of the low pressure compressor; and/or the first engine core and the second engine cores can be arranged coaxially.

A method for use with a gas turbine engine system can include moving fluid with a fan section; compressing fluid from the fan section; passing at least a first portion of the compressed fluid through a first engine core to generate combustion products in the first engine core using at least some of the first portion of the compressed fluid; controlling a flowpath control mechanism to selectively direct a second portion of the compressed fluid to a second engine core or the first engine core; when the flowpath control mechanism allows the second portion of the compressed fluid to flow into the second engine core, generating combustion products in the second engine core using at least some of the second portion of the compressed fluid; and when the flowpath control mechanism blocks the second portion of the compressed fluid from flowing into the second engine core, generating combustion products in the first engine core using at least some of the second portion of the compressed fluid.

The method of the preceding paragraph can optionally include, additionally and/or alternatively, any one or more of the following features and/or additional steps:

mixing combustion products from the first and second engine cores in a fan bypass duct;

passing combustion products from the first and second engine cores through a mixing chute at or near a downstream end of a fan bypass duct;

controlling a flowpath control mechanism to selectively direct a second portion of the compressed fluid to a second engine core or the first engine core can comprise moving a valve element; and/or selectively mechanically coupling shafts of the first and second engine cores.

A gas turbine engine system can include a fan section; a bypass duct downstream of the fan section; a low pressure compressor section downstream of the fan section; a first engine core downstream from the low pressure compressor section, wherein the first engine core has a reverse flow configuration relative to fluid flow through the bypass duct, the first engine core including a first engine core compressor section; a first engine core combustor downstream of the first engine core compressor section; and a first engine core turbine section downstream of the first engine core combustor; a low pressure turbine section located downstream of the first engine core, wherein only exhaust fluid from the first engine core passes through the low pressure turbine section; an exhaust pipe configured to direct exhaust fluid flow from the low pressure turbine section to the bypass duct; a second engine core downstream from the low pressure compressor section, the second engine core including a second engine core compressor section; a second engine core combustor downstream of the second engine core compressor section; and a second engine core turbine section downstream of the second engine core combustor; and a flowpath control mechanism configured to selectively restrict fluid flow through the second engine core.

The system of the preceding paragraph can optionally include, additionally and/or alternatively, any one or more of the following features, configurations and/or additional components:

a first engine core shaft operably connected between the first engine core compressor section and the first engine core turbine section;

a second engine core shaft operably connected between the second engine core compressor section and the second engine core turbine section; and/or a clutch operably connected between first and second engine core shafts for selectively transmitting torque therebetween.

The invention claimed is:

1. A gas turbine engine system comprising:
a fan section;
a low pressure compressor section downstream of the fan section;
a bypass duct operatively connected downstream of the fan section in parallel with the low pressure compressor section;
a first engine core downstream from the low pressure compressor section, the first engine core comprising:
a first engine core compressor section;
a first engine core combustor downstream of the first engine core compressor section; and
a first engine core turbine section downstream of the first engine core combustor;
a second engine core downstream from the low pressure compressor section, the second engine core located axially behind the first engine core and sharing a rotational axis with the first engine core, the second engine core comprising:
a second engine core compressor section;
a second engine core combustor downstream of the second engine core compressor section; and
a second engine core turbine section downstream of the second engine core combustor;
a flowpath control mechanism configured to selectively restrict fluid flow through the second engine core.

2. The system of claim 1, wherein the first engine core has a reverse flow configuration such that combustion products from the first engine core combustor flow through the first engine core combustor in a direction generally opposite to fluid flow through the fan section, the first engine core further comprising:
an exhaust pipe configured to direct fluid flow from the first engine core turbine section to the bypass duct.

3. The system of claim 2, wherein the second engine core has an axial flow configuration such that combustion products from the second engine core combustor flow through the second engine core combustor in a direction generally the same as fluid flow through the fan section.

4. The system of claim 3 and further comprising:
a flow mixer configured to mix fluid flows exhausted from both the first and second engine cores.

5. The system of claim 4 and further comprising:
a bypass fluid flow from the fan section that bypasses the first and second engine cores,
wherein the flow mixer is further configured to mix the bypass fluid flow with the fluid flows exhausted from both the first and second engine cores.

6. The system of claim 1 wherein the second engine core has a reverse flow configuration such that combustion products from the second engine core combustor flow in a direction generally opposite to fluid flow though the fan section, the second engine core further comprising:
an exhaust pipe configured to direct fluid flow from the second engine core turbine section to the bypass duct.

7. The system of claim 1, wherein the first and second engine cores each have a reverse flow configuration such that combustion products from the first and second engine core combustors flow through the respective first and second engine core combustors in a direction generally opposite to fluid flow through the fan section, the system further comprising:
a first exhaust pipe configured to direct fluid flow from the first engine core turbine section to the bypass duct; and
a second exhaust pipe configured to direct fluid flow from the second engine core turbine section to the bypass duct.

8. The system of claim 1 and further comprising:
a low pressure turbine section located downstream of the first engine core, wherein only exhaust fluid from the first engine core passes through the low pressure turbine section.

9. The system of claim 1, wherein the flowpath control mechanism comprises a valve.

10. The system of claim 1 and further comprising:
a first engine core shaft operably connected between the first engine core compressor section and the first engine core turbine section;
a second engine core shaft operably connected between the second engine core compressor section and the second engine core turbine section; and
a clutch operably connected between first and second engine core shafts for selectively transmitting torque therebetween.

11. The system of claim 1, wherein the flowpath control mechanism is positioned axially aft of the first engine core.

12. The system of claim 1, wherein the flowpath control mechanism extends into a flow directing duct downstream of the low pressure compressor.

13. A method of using the gas turbine engine system of claim 1, the method comprising:
moving fluid with the fan section;
compressing fluid from the fan section;
passing at least a first portion of the compressed fluid through the first engine core to generate combustion products in the first engine core using at least some of the first portion of the compressed fluid;
controlling the flowpath control mechanism to selectively direct a second portion of the compressed fluid to the second engine core or the first engine core;
when the flowpath control mechanism allows the second portion of the compressed fluid to flow into the second engine core, generating combustion products in the second engine core using at least some of the second portion of the compressed fluid; and
when the flowpath control mechanism blocks the second portion of the compressed fluid from flowing into the second engine core, generating combustion products in the first engine core using at least some of the second portion of the compressed fluid.

14. The method of claim 13 and further comprising:
mixing combustion products from the first and second engine cores in a fan bypass duct.

15. The method of claim 13 and further comprising:
passing combustion products from the first and second engine cores through a mixing chute at or near a downstream end of a fan bypass duct.

16. The method of claim 13, wherein controlling a flowpath control mechanism to selectively direct a second portion of the compressed fluid to a second engine core or the first engine core comprises moving a valve element.

17. The method of claim 13 and further comprising:
selectively mechanically coupling shafts of the first and second engine cores.

18. A gas turbine engine system comprising:
a fan section;
a bypass duct downstream of the fan section;
a low pressure compressor section downstream of the fan section;
a first engine core downstream from the low pressure compressor section, wherein the first engine core has a reverse flow configuration relative to fluid flow through the bypass duct, the first engine core comprising:
a first engine core compressor section;
a first engine core combustor downstream of the first engine core compressor section; and
a first engine core turbine section downstream of the first engine core combustor;
a low pressure turbine section located downstream of the first engine core, wherein only exhaust fluid from the first engine core passes through the low pressure turbine section;
an exhaust pipe configured to direct exhaust fluid flow from the low pressure turbine section to the bypass duct;
a second engine core downstream from the low pressure compressor section, the second engine core located axially behind the first engine core and sharing a rotational axis with the first engine core, the second engine core comprising:
a second engine core compressor section;
a second engine core combustor downstream of the second engine core compressor section; and
a second engine core turbine section downstream of the second engine core combustor; and
a flowpath control mechanism configured to selectively restrict fluid flow through the second engine core.

19. The system of claim 18 and further comprising:
a first engine core shaft operably connected between the first engine core compressor section and the first engine core turbine section;
a second engine core shaft operably connected between the second engine core compressor section and the second engine core turbine section; and
a clutch operably connected between first and second engine core shafts for selectively transmitting torque therebetween.

* * * * *

UNITED STATES PATENT AND TRADEMARK OFFICE
CERTIFICATE OF CORRECTION

PATENT NO.         : 9,222,409 B2
APPLICATION NO.    : 13/421241
DATED              : December 29, 2015
INVENTOR(S)        : Daniel Bernard Kupratis and Joseph B. Staubach Page 1 of 1

It is certified that error appears in the above-identified patent and that said Letters Patent is hereby corrected as shown below:

In the claims;
Col. 10, Line 51, Claim 8;
    Delete "though"
    Insert --through--

Signed and Sealed this
Nineteenth Day of July, 2016

Michelle K. Lee
*Director of the United States Patent and Trademark Office*